4?--85 SF
1/?/?7 DR RE 32,366

United States Patent [19]

Garber

[11] E Patent Number: Re. 32,366

[45] Reissued Date of Patent: Mar. 3, 1987

[54] BOOM LIMIT SAFETY CONTROL CIRCUIT

[75] Inventor: Eugene L. Garber, McConnellburg, Pa.

[73] Assignee: JLG Industries, Inc., McConnellsburg, Pa.

[21] Appl. No.: 607,314

[22] Filed: May 4, 1984

Related U.S. Patent Documents

Reissue of:

[64] Patent No.: 4,395,706
Issued: Jul. 26, 1983
Appl. No.: 223,898
Filed: Jan. 7, 1981

U.S. Applications:

[63] Continuation-in-part of Ser. No. 164,281, Jun. 30, 1980, abandoned.

[51] Int. Cl.[4] ..... B66C 15/06; G08B 21/00

[52] U.S. Cl. ..... 340/685; 212/154; 340/686; 340/870.38

[58] Field of Search ..... 340/685, 686, 870.21, 340/870.38; 364/463, 559, 562, 567; 212/153–156; 91/1; 92/5 R

[56] References Cited

U.S. PATENT DOCUMENTS

| | | | |
|---|---|---|---|
| 3,474,434 | 10/1969 | Lindberg et al. | 340/870.38 X |
| 3,586,841 | 6/1971 | Griffin | 364/567 X |
| 3,631,537 | 12/1971 | Zibolski et al. | 340/870.38 X |
| 3,638,211 | 1/1972 | Sanchez | 340/685 X |
| 3,641,551 | 2/1972 | Sterner et al. | 212/154 X |
| 3,740,534 | 6/1973 | Kezer et al. | 364/463 X |
| 3,833,932 | 9/1974 | Hamilton | 340/685 |
| 4,054,055 | 10/1977 | Simon | 340/685 X |
| 4,185,280 | 1/1980 | Wilhelm | 340/685 X |
| 4,205,308 | 5/1980 | Haley et al. | 340/686 |
| 4,216,868 | 8/1980 | Geppert | 340/685 X |
| 4,222,491 | 9/1980 | Geppert | 364/567 X |

FOREIGN PATENT DOCUMENTS 2504455 8/1976 Fed. Rep. of Germany

*Primary Examiner*—James L. Rowland
*Assistant Examiner*—Thomas J. Mullen, Jr.
*Attorney, Agent, or Firm*—Irvin A. Lavine

[57] ABSTRACT

A safety circuit for a lifting device extensible boom is presented wherein the boom angle of elevation and boom length are each converted into a parallel coded word. The two coded words, one representing boom angle and the other boom length, are processed in a digital logic network which provides inhibit functions that prevent boom extension or boom lowering when either of the two boom actions will place the boom in a position which will damage the boom or topple the machine. A plurality of switches are associated with the boom to generate and apply the boom length code word to a monitoring circuit, which responds thereto to provide a switch malfunction signal when one of the switches is defective, whereby boom extension or lowering are inhibited.

24 Claims, 7 Drawing Figures

BOOM LIMIT SAFETY CONTROL CIRCUIT

Matter enclosed in heavy brackets [ ] appears in the original patent but forms no part of this reissue specification; matter printed in italics indicates the additions made by reissue.

TECHNICAL FIELD

The present application is a continuation-in-part of patent application Ser. No. 164,281, filed June 30, 1980, now abandoned.

This invention relates to a safety circuit for an extensible crane boom of the type which may be rotated between a horizontal and a vertical position and used as a personal lifting device. The safety circuit provides cutout functions which inhibit boom extension or rotation which would cause the boom moment about a pivot point to exceed precalculated safe load levels. The circuit includes solid state logic adapted to process electrical step functions related to boom length and boom angle.

BACKGROUND OF PRIOR ART

The use of safety circuits to prevent overloading an extensible boom crane and thus damaging the boom or causing the device to topple are well known in the art, but of the multitude of devices, all incorporate compromises which result in significant shortcomings in the applied systems.

The prior art safety devices may be grouped in two broad categories, one category which comprises those systems which prevent an operator from extending or lowering a boom into a region of unsafe operation and a second type which provides an alarm to warn an operator of an impending disaster such as crushing the boom or tipping the crane.

R. Sterner, U.S. Pat. No. 3,641,551 on "Safe Load Control System For Telescopic Crane Booms" issued Feb. 8, 1972 is typical of the first type of safety systems which include both an overload prevention and an indicator system. These devices typically include an electrical circuit responsive to a first electrical network which changes as a function of boom length and a second electrical circuit which changes as a function of boom angle for providing a warning indication and inhibiting the operation of a hydraulic boom drive means.

The safety control systems such as found in Sterner include series circuits comprised of a large number of electrical contacts that are subject to contamination and failure. A malfunction of the system can lead to an inoperative boom in one failure mode or a short circuited, bypassed safety system in a second failure mode which would allow an operator unknowingly to exceed safe limits of his device.

C. Kezer et al, in U.S. Pat. No. 3,740,534 on "Warning System For Load Handling Equipment" issued June 19, 1973 is exemplary of systems adapted primarily to provide an operator with a warning that continued operation will be hazardous and may result in a catastrophic failure. Systems such as this do not provide a system inhibit function such as provided by the Sterner type systems discussed above and thus do not provide the safety feature of a system capable of overriding the actions of an imprudent operator. Kezer et al illustrates the current trend of replacing electro-mechanical control systems with electronic logic systems. However, the advances in this phase of the art have been relatively complex and incorporate extensive electronic systems which are costly to manufacture and subject to a high failure rate due to the large number of interdependent circuits.

OBJECTIVES OF THE INVENTION

Therefore, it is a primary objective of the present invention to provide a safety control circuit for a boom actuation system which is comprised of a mixture of electromechanical and solid state logic devices interacting to provide a safer system having a minimum number of electro-mechanical and solid state elements.

A further objective of the present invention is to provide a solid state logic control means responsive to electrical functions representing boom angle and boom length for inhibiting boom extension or boom lowering which would cause the boom to exceed a safe operational envelope.

A still further objective of the present invention is to provide a relatively simple solid state logic system responsive to incremental voltage levels provided by a pendulum potentiometer, and boom length control functions provided by a group of electrical switches which function in a mutually exclusive manner.

Another objective of the present invention is to provide a boom warning system and a safer operator override means which is inexpensive to produce, easy to maintain and relatively safer with respect to the prior art.

A still further objective of the present invention is to monitor the plurality of electromechanical devices for malfunction, and if malfunctioning, to inhibit boom extension and boom lowering.

BRIEF SUMMARY OF THE INVENTION

The boom safety control system disclosed herein includes integrated NAND logic circuits which provide a warning indication and inhibit the boom extension function or boom lowering function when the boom has reached a predetermined position within a prescribed safe operational envelope.

Boom angle data is provided to the logic circuit via a stepping comparator which provides a boom angle pulse coded word. The stepping comparator compares adjustable limit values with stepped voltages provided by a pendulum potentiometer driven by the boom. Boom length or extension data is provided to the logic circuitry in the form of a code word generated by a plurality of switches responsive to boom position and adapted to close in a mutually exclusive fashion.

The boom length coded word or expression is combined with the coded word or expression generated by the boom angle stepped comparator in two separate logic systems which inhibit boom lowering or boom extension if safe limits will be exceeded.

A monitoring circuit examines the coded word indicative of boom length to determine whether any of the plurality of switches is malfunctioning and, if so, for inhibiting boom extension and lowering. An override switch is operator actuable to permit boom lowering even if one or more of the plurality of switches is malfunctioning.

DETAILED DESCRIPTION OF THE INVENTION

Figure 1:
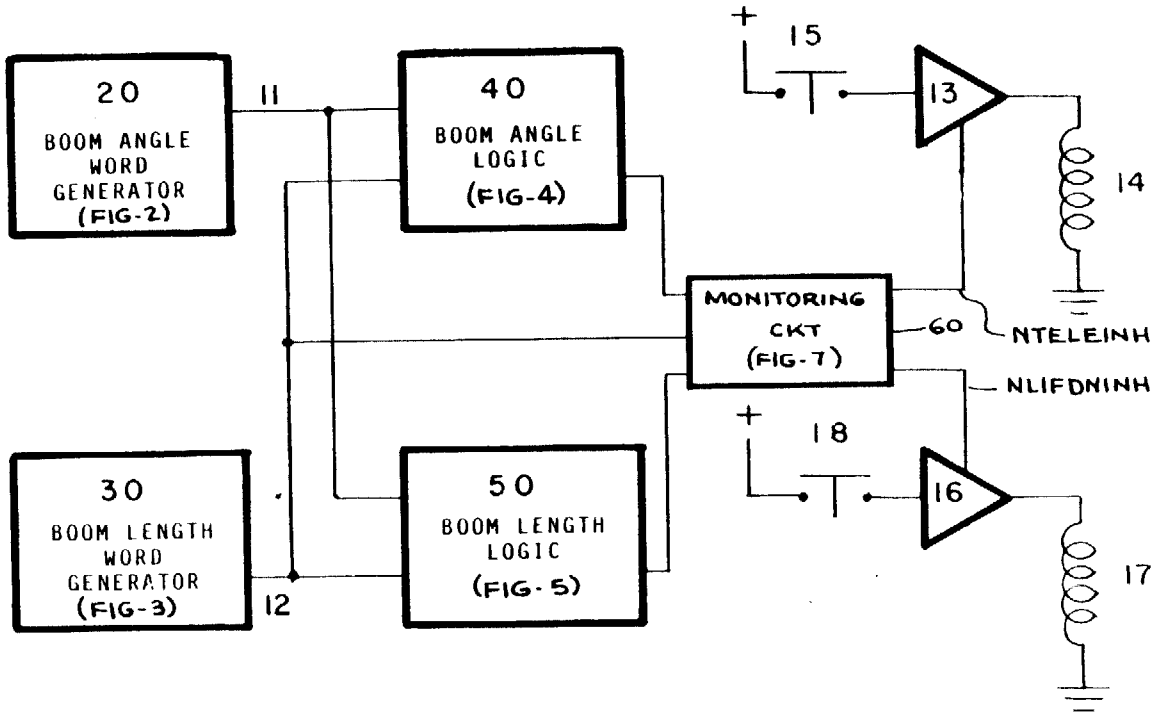
FIG. 1 is a block diagram of the principle components of the described safety system.

FIG. 1 is a block diagram depicting the basic functional elements of the present invention.

The boom angle word generator, 20, produces a coded word or expression comprised of high and low voltage levels across a plurality of parallel conductors 11 which are branched and applied to both the boom angle logic circuit 40 and boom length logic circuit 50.

The boom length word generator 30 produces a coded word or expression comprised of high and low voltage levels across a plurality of conductors 12 which are branched and applied to both the boom angle logic circuit 40 and boom length logic circuit 50.

Figure 3:
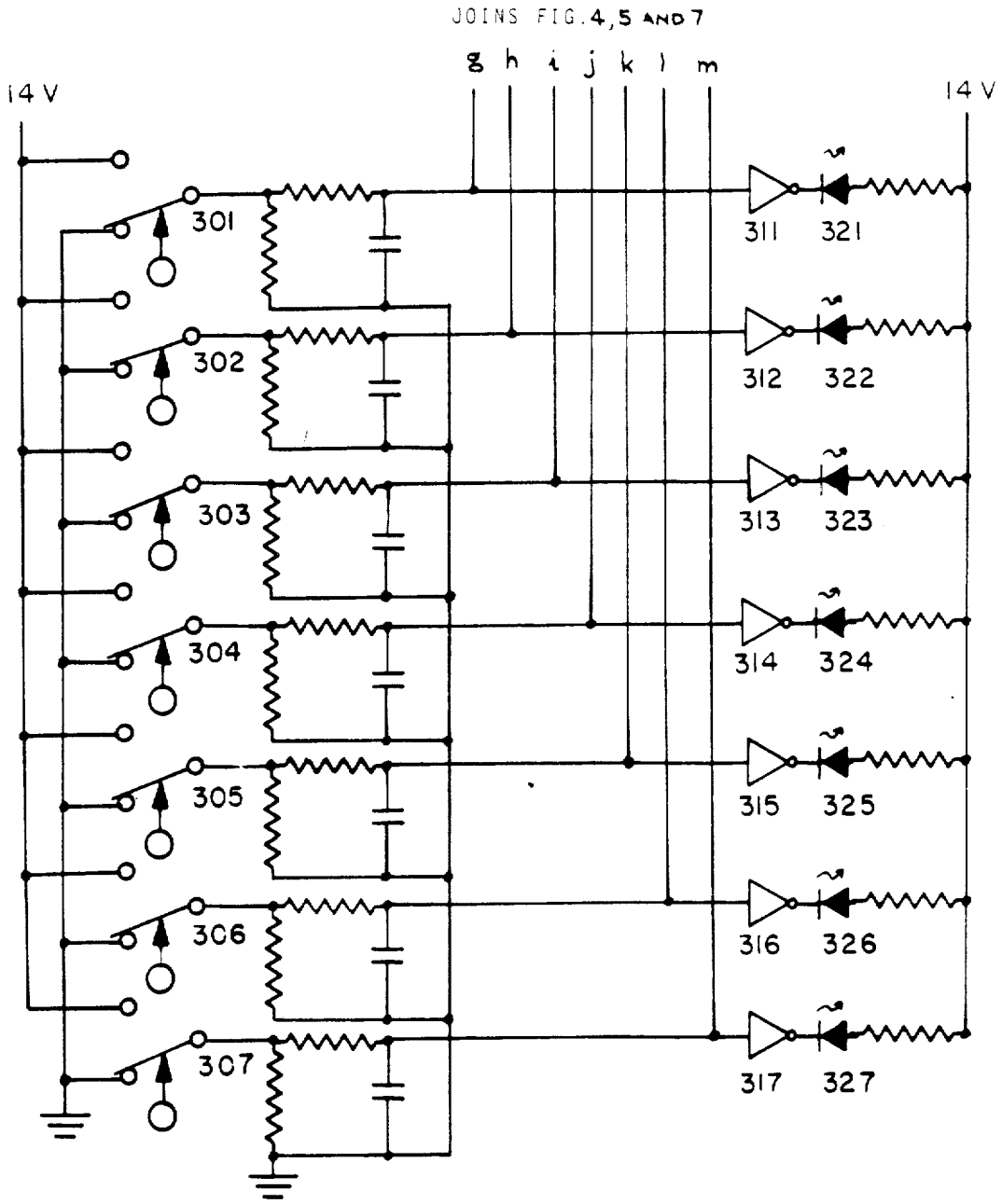
FIG. 3 is a schematic diagram of the boom length sensing means and boom length word generating circuit.

Further, the output of the boom length word generator 30 is applied to a monitoring circuit 60, as will be explained in detail with respect to FIG. 7. The monitoring circuit 60 determines whether the generator 30 and in particular a series of switches, as will be explained with respect to FIG. 3, are operative or malfunctioning; if malfunctioning, the monitoring circuit 60 generates and applies a pair of inhibit signals NTELEINH and NLIFDNINH to amplifiers 13 and 16 to respectively inhibit the extension and lowerin of the boom. The boom angle logic circuit 40 and the boom length logic circuit 50 are each coupled to the monitoring circuit 60 and normally actuate the monitoring circuit 60 to render each of the signals NTELEINH and NLIFDNINH signals high whereby the amplifiers 13 and 16 are enabled to permit, respectively, the extension and lowering of the boom. However, when the boom angle logic circuit 40 determines from its inputs that it is unsafe to lower the boom due to its length, the circuit 40 actuates the monitoring circuit 60 to dispose the NLIFDNINH signal low or to a zero level to inhibit the operation of the amplifier 16. In a similar matter, if the boom angle logic circuit 40 determines that it is unsafe to extend the length of the boom, the monitoring circuit 60 is actuated to dispose the NTELEINH signal low thus defeating the operation of the amplifier 13. Further, the monitoring circuit 60 includes an override switch 744, as will be explained with respect to FIG. 7, that may be closed to override the inhibit signal NLIFDNINH forcing it to its high state to permit energization of the amplifier 16 and the lowering of the boom.

In particular, the amplifier 13 functions as a solenoid driver which energizes the hydraulic control valve 14 for the boom extension hydraulic circuit in response to a high voltage level applied to the input to amplifier 13 via the boom extension switch 15. However, if the boom angle logic circuit 40 determines that it is unsafe to extend the boom, the output of the logic circuit drops to 0 and amplifier 13 is inhibited. Thus depression of the boom extension switch 15 will not cause solenoid coil 14 to open the hydraulic valve permitting boom extension. Thus the control circuit includes a safer feature wherein failure of the logic circuit will inhibit operation of the boom extension mechanism.

The boom down circuit comprised of amplifier 16, solenoid 17 and boom down switch 18 functions in a manner similar to the boom extension circuit discussed above. A high signal NLIFDNINH biases the amplifier 16 so that it will conduct if a positive potential is applied to the input. The boom down switch 18 provides the required positive input when the operator selects boom down functions. The solenoid coil 17 is energized and the boom down hydraulic valve of the system is activated. On the other hand, if the NLIFDNINH signal is low, the depression of the down switch 18 will not energize solenoid coil 17 and the boom cannot be lowered until such time that the boom length is reduced to a safe value.

It should be understood that the above discussion is directed to a preferred embodiment utilizing hydraulic actuators for boom extension and boom lift/down functions. However, it is within the scope of this invention to use pneumatic, electrical, or other means controlled by amplifiers 13 and 16 to drive the boom.

Figure 2:
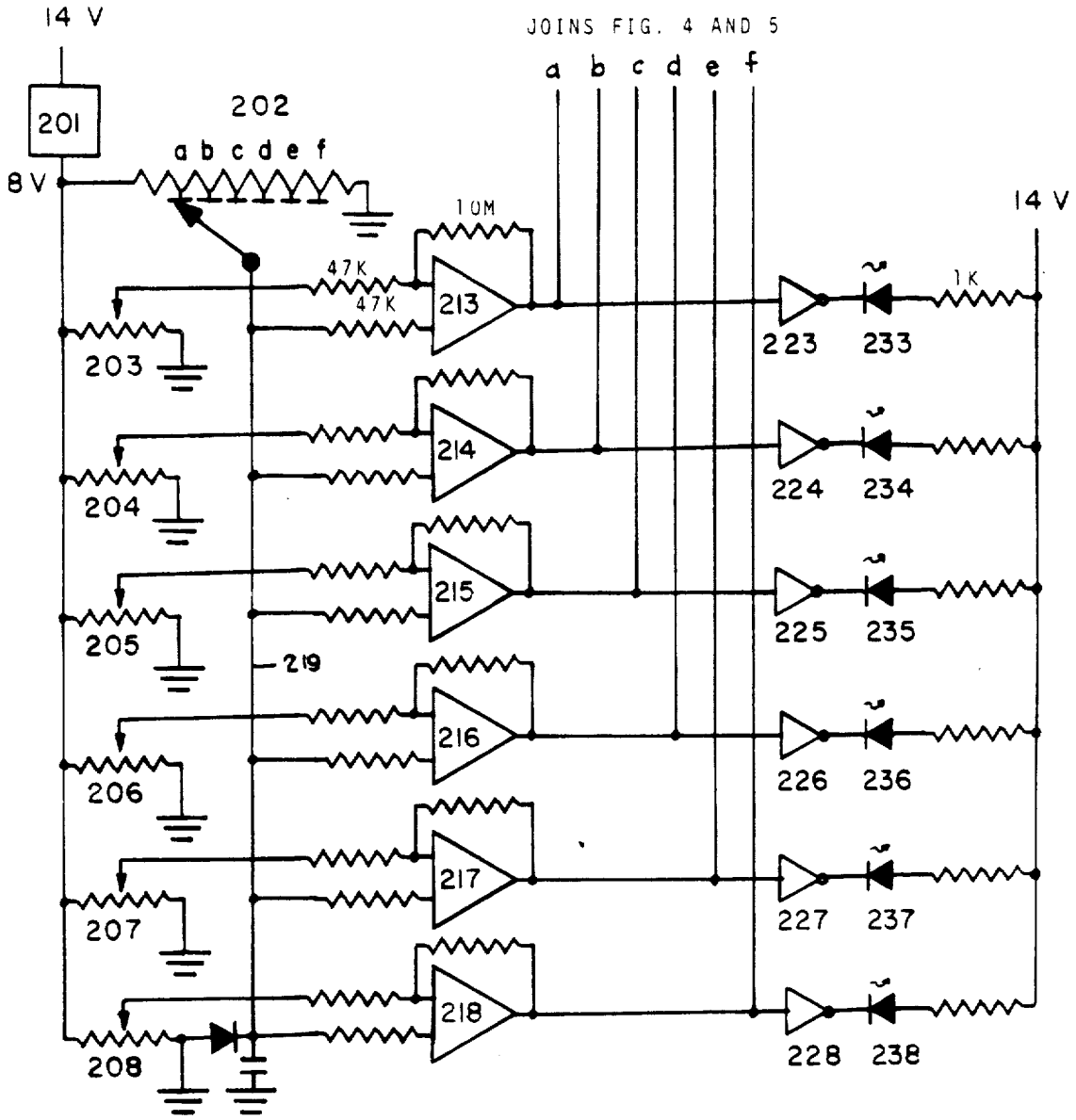
FIG. 2 is a schematic diagram of the boom angle stepped comparator and boom angle word generating circuit.

FIG. 2 discloses in detail a schematic of the boom angle stepped comparator and boom angle word generating circuit identified in the block diagram of FIG. 1 as the boom angle word generator 20.

The circuit of FIG. 2 includes a type LM340-8 voltage regulator 201 which receives an input of 14 volts DC and provides a regulated 8 volts DC output. The 8 volt output is applied to pendulum potentiometer 202 which has 6 contact pads that are sequentially swepted by a contact arm mechanically coupled to the boom. The pendulum potentiometer functions as a voltage divider network with the 6 contact pads and contact arm dimensioned such that the voltage level delivered to the sweeping contact arm is a function of a specific boom angle range as indicated in the table below.

| BOOM ANGLE | VOLTAGE | CONTACT PAD |
|---|---|---|
| 0° | 0.5 volts | a |
| 16° | 1.77 volts | b |
| 32° | 3.04 volts | c |
| 39° | 3.60 volts | d |
| 50° | 4.47 volts | e |
| 59° | 5.19 volts | f |

The output of voltage regulator 201 is also applied to the parallel voltage divider ladder comprised of potentiometers 203 through 208. Potentiometer 203 is adjusted to provide a voltage level equal to 0.5 volts or the output of contact pad a of pendulum potentiometer 202. In a similar fashion, potentiometers 204 through 208 are adjusted to provide voltage levels corresponding, respectively, to the voltages provided by contact pads b through f of pendulum ppotentiometer 202.

The outputs of potentiometers 203 through 208 are applied via a 47 kilohm resistance to the negative input of operational amplifiers 213 through 218 respectively. A 10 megohm feedback path to the negative input is provided for each of the operational amplifiers and they are adapted to function as comparators. Thus when contact pad a of the pendulum potentiometer 202 is connected via the sweeping contact arm to the positive input bus 219 of comparators 213 through 218, the output of comparator 213 will be a 1 or a high logic level and the outputs of the remaining comparators will be a 0 or a low logic level. As the boom is raised, the sweeping arm of pendulum potentiometer 202 contacts pad b and 1.30 volts is applied to bus 219. This causes the outputs of comparators 213 and 214 to become high and the remaining comparators to remain at 0. Thus as the boom is raised, the outputs of the parallel comparators 213 through 218 sequentially step to provide a digital word across the parallel outputs which begins as 100000 when the sweeping arm of pendulum potentiometer 202 reaches contact pad a and progresses to 111111 as the arm reaches pad f.

Inverters 223 through 228 are inverting amplifiers of the type CD4049C in a preferred embodiment. These amplifiers are associated with comparators 213 through 218 respectively and in response to a comparator providing a hight voltage level output, cause light emitting diodes 233 to 238 to sequentially become illuminated as a function of the sequential activation or conduction of the comparators. The light emitting diodes may be a type MV5153 which when connected to the unregulated system power source through 1 kilohm resistors will create a light indication of boom angle.

The boom length word generator 30 of FIG. 1 is illustrated in detail in FIG. 3 of the boom length sensing means and boom length word generator circuit. The boom length sensing means is comprised of 7 microswitches 301 through 307 which are single-pole double-throw microswitches adapted to provide either a positive voltage level output or a ground which logically provide either a 1 or 0 output on 7 parallel lines which comprises the boom length word.

Microswitches 301 through 307 are activated by a cam means mounted on the base of the boom and dimensioned to activate the switches sequentially in a mutually exclusive fashion so that only one switch at any given time will be connected to the positive voltage source.

The 7 parallel lines forming the boom length word are connected to light emitting diodes 321 through 327 respectively via inverters 311 through 317 respectively to switches 301 through 307 respectively. Thus only one inverter will provide a negative potential at the cathode of one of the light emitting diodes at any given boom length and the light emitting diode serves as an indication of boom extension. In a preferred embodiment, the inverting amplifiers may be CD4049C amplifiers and the light emitting diodes may be type MV5353.

The parallel output word of the boom length generator is applied to both the boom angle logic circuit 40 and boom length logic circuit 50 of FIG. 1 as is the parallel word output of the boom angle word generator.

Figure 4:
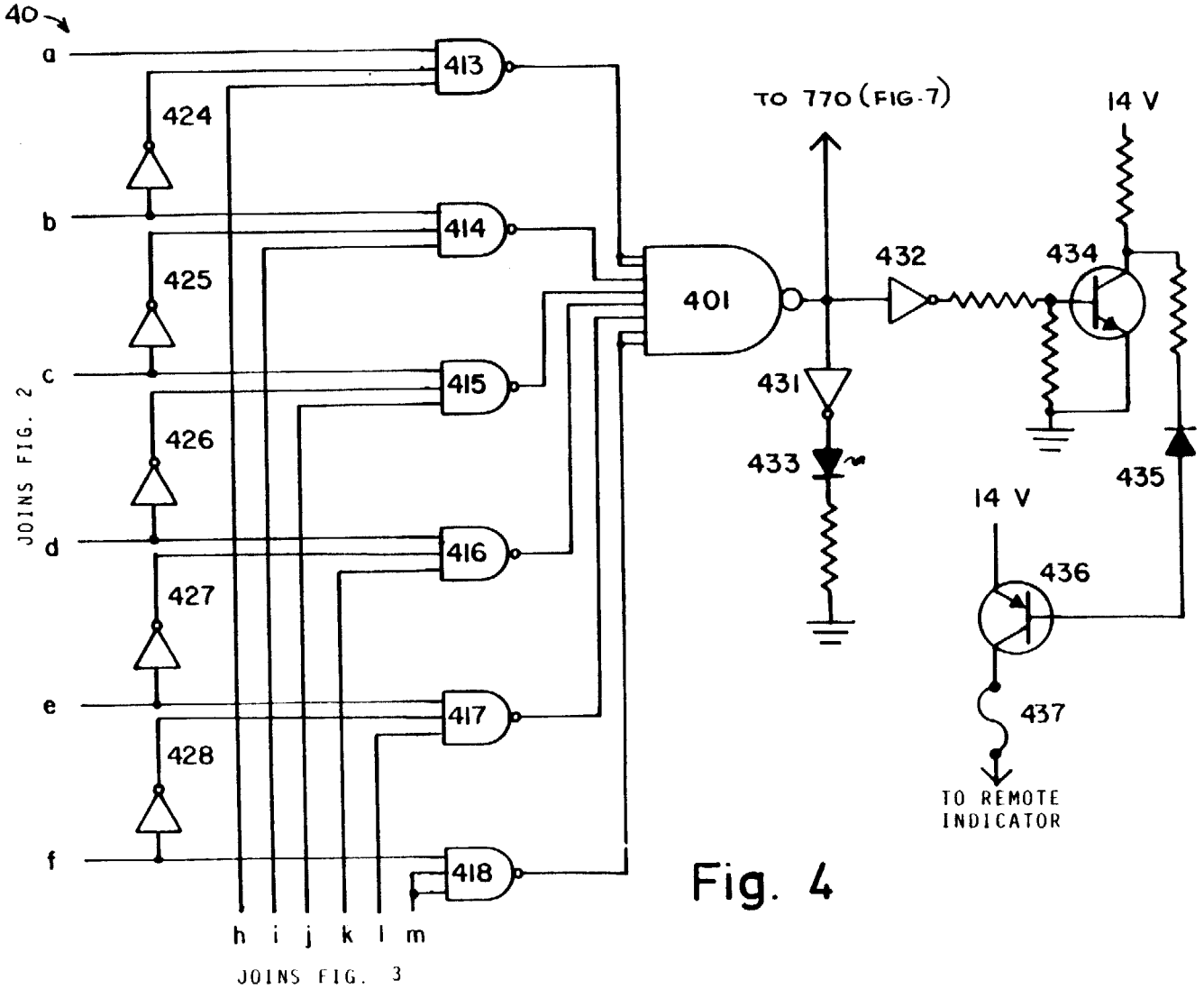
FIG. 4 is a schematic diagram of the boom extension inhibit logic circuit.

The boom extension inhibit logic circuit of FIG. 4 includes the detailed logic schematic of the boom angle logic circuit 40 of FIG. 1. This logic circuit is based upon an 8 input NAND gate 401 which, in a preferred embodiment is a type NM74C30. The 8 input NAND gate is driven by a decoder circuit comprised of six 3 input NAND gates 413 through 428 responsive to the boom angle word, an inverse function of the boom angle word, and the boom length word. The six, 3 input NAND gates are type NM74C10's in a preferred embodiment and NAND gates 413 through 417 respectively receive inverse functions of the boom angle word via inverter amplifier 424 through 428, which in a preferred embodiment may be type NM74C04's. The NAND gates also receive combination functions of the boom length word via OR gates 441 through 445.

NAND gates 401 and 413 through 418 provide a high or 1 output if one or more of the inputs are low or 0. If all inputs are high, the output of the NAND gate will be low. Thus if all inputs to NAND gate 401 are high or 1, the output of the NAND gate will be low or 0.

A 0 output of NAND gate 401 provides a 0 output to inverters 431, 438, and 432 which are type CD4049C inverting amplifiers. When a zero potential is applied to inverter 431, light emitting diode 433 is energized via a 1 kilohm resistor and provides an okay telescope out indication. The light emitting diode 433 may be a type MV5253.

The 0 output of NAND gate 401 is applied to the boom length word generator monitoring circuit 60, which applies a positive, high bias enabling signal to amplifier 13, thus permitting the energization of the boom extension solenoid coil 14 as shown in FIG. 1. The output of NAND gate 401 is also applied to the monitoring circuit 60 as shown in FIG. 7 and in particular via OR gates 770 and 766 to an inverter 768, whose output is the NTELEINH signal applied to the amplifier 13. The output is also applied via an amplification and isolation network to a donot telescope outlight located in a remote control location such as a basket in the end of the boom. The remote isolation network is comprised in a preferred embodiment of a 2N6010 transistor 434 resistively coupled to a 1N914 diode 435 which is coupled via a D41D transistor 436 to the remote location via a fuse 437.

Logically the circuit functions as follows: assume the boom is in its fully retracted position. In this case switch 301 of FIG. 3 is closed and a logic 1 is applied to its output and a logic 0 applied to the outputs of microswitches 302 through 307. Thus the 6 bit word from the boom length word generator to the boom extension logic circuit is comprised of 6 zeros and NAND gates 413 through 418 uniformly provide a 1 output. The 6 high level outputs cause NAND gate 401 to produce a 0 or low level output and the boom extension amplifier is enabled. If the boom is now extended so that microswitch 302 closes, microswitch 301 will open and logic zeros will be applied from the boom length word generator to NAND gates 414 through 418 but a logic 1 will be applied to NAND gate 413.

In the above situation, if the boom is at a 0 angle the boom word will be 100000 with the output of comparator 213 providing the 1 or high level output which is coupled to one input of NAND gate 413. The remaining input to NAND gate 413 is provided by comparator 214. This comparator is producing a 0 logic level but inverter 424 causes the output to assume a high level and thus the three inputs of NAND gate 413 are high. This causes the output of the NAND gate 413 to be low which causes the output of NAND gate 401 to go high and inhibit amplifier 13 of FIG. 1 so that the boom cannot be extended.

However, if the boom is raised so that the sweeping arm of pendulum potentiometer 202 is on the c pad, comparators 213, 214 and 215 will provide a high level output to NAND gates 413, 414 and 415 respectively. NAND gate 413 will be inhibited however by the inverted output of comparator 214 via inverter 424 and NAND gate 414 will be inhibited by the inverted output of comparator 215 via inverter 425. However, the low level output of comparator 216 will be inverted via inverter 426 to provide a second high level input to NAND gate 415. This causes NAND gates 413 through 418 to produce high level outputs so long as the boom limit switch 301 or 302 remain closed. Thus the boom extension solenoid may be activated and the boom lengthened.

When the boom is extended to a point where microswitch 304 closes, the input word from the boom length word generator changes to 0001000 and in combination with the existing angle word causes NAND gate 416 to produce a low level output. This causes NAND gate 401 to produce a high level output and the boom extension system is inhibited as previously explained.

Figure 5:
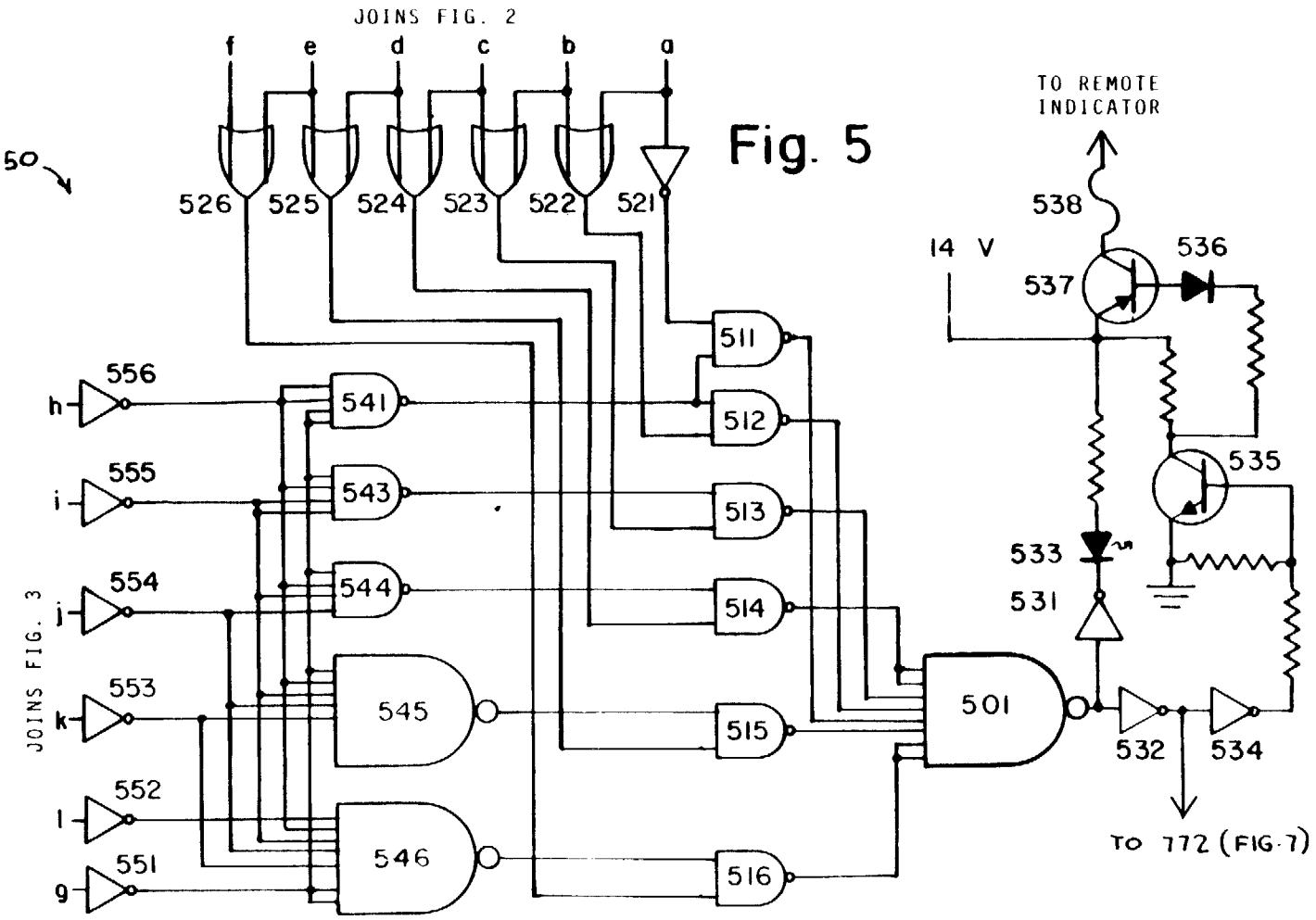
FIG. 5 is a schematic diagram of the boom down inhibit logic circuit.

The boom down inhibit logic circuit of FIG. 5 includes the boom length logic 50 of FIG. 1. It is comprised of an 8 input NAND gate 501 which performs a function similar to NAND gate 401 of the boom angle logic circuit.

NAND gate 501 is a type MM74C30 and is controlled by inputs from six 2 input NAND gates 511 through 516 of the type MM74C00. This circuit utilizes a 3 NAND gate tree as opposed to the 2 NAND gate 3 of the boom angle logic circuitry 40 and thus a 1 output of NAND gate 501 provides a logic function which permits boom down activation. For instance, when a 1 or high logic level is available at the output of NAND gate 501, this high is applied through an inverter 532 to one input of a NOR gate 772 as shown in FIG. 7; in turn, the output of the NOR gate 772 is inverted by an inverter 773 and applied to a NOR gate 774 whose output comprises the boom down inhibit signal NLIFDNINH as applied to the amplifier 16 of FIG. 1. If the inhibit signal NLIFDNINH is a high or one, the amplifier 16 is enabled so that the actuation of the down switch 18 energizes the solenoid coil 17 to effect a lowering of the boom as described above.

A high or 1 level at the output of NAND gate 501 is applied through inverters and they provide functions similar to like components in the boom angle logic circuit. For instance, the high level applied to inverter 531 creates a low level at the cathode of light emitting diode 533. This light emitting diode is an MV5253 and the low level signal at its cathode causes it to illuminate and provide an okay lift down indication. The output of inverter 532 is applied to a coupling circuit comprised of transistor 535, isolation diode 536 and transistor 537 which, via a fuse 538 provides an energizing potential to a remote okay lift down indicator. The remote donot lift down indicator may be in a remote facility such as a personal basket at the end of the boom.

As previously stated, NAND gate 501 is controlled by the inputs from six NAND gates, 511 through 516 respectively. These are 2 input NAND gates and NAND gates 511 through 516 receive inputs from signal position functions of the boom angle word directly.

The six input NAND gates 511 through 516 also receive inputs from five additional NAND gates comprised of three 4 input NAND gates 541, 543 and 544 and two 8 input NAND gates 545 and 546.

The 8 input NAND gate 546 is jumpered to function as a 6 input NAND gate similar to NAND gates 401 and 501, and may illustratively take the form of a type MM74C30. NAND gate 545 is a type MM74C30 but is is jumpered to function as a 5 input NAND gate. NAND gates 541, 543 and 544 are 4 input NAND gates of the type MM74C20. NAND gate 541 is jumpered to function as a 2 input NAND gate, NAND gate 543 is jumpered to function as a 3 input NAND gate, and NAND gate 544 functions as a straight 4 input NAND gate. The inputs to NAND gates 541, 543, 544, 545 and 546 are provided by combinations of six of the seven bit positions of the boom length word as generated by microswitches 301 through 306. Thus if switches 301 through 306 are open, and switch 307 is closed, the bit positions of the boom length word applied to the boom length logic circuit are all 0 and inverters 551 through 556 provide high inputs to all inputs to NAND gates 541, 543, 544, 545 and 546.

In the above circumstance, the primary down logic NAND gates comprised of 541, 543, 544, 545 and 546 all provide low level or 0 outputs causing the six intermediate NAND gates 511 through 516 to produce high level outputs which causes NAND gate 501 to produce a low level output and inhibit the boom down amplifier 16. In this situation, the boom is fully extended and elevated to an angle of at least 59°.

With the boom fully extended and in the vertical position, the boom down circuit is thus inhibited. However, the logic 1 from the boom length word and the logic 1 from the boom angle word applied to NAND gate 418 of FIG. 4 cause the output of that NAND gate to be a logic 0 and thus the output of NAND gate 401 is a logic 1 which inhibits the boom extension circuit but it does not inhibit the boom retraction circuit. Therefore, the boom may be retracted and if retracted to a point where switch 306 closes, the resultant logic 1 at the 306 bit position of the boom length word causes the output of inverter 552 to go to 0 or a logic low. This causes NAND gate 546 to produce a 1 output which is applied to NAND gate 516. With the system in the condition as described above, a 1 is also provided to NAND gate 516. This results in a 0 output for NAND gate 516 and it causes the output of NAND gate 501 to go high. This enables boom down amplifier 16 so that the boom down switch 18 can activate solenoid coil 17 to lower the boom until the output of comparator 218 switches from 1 to 0, caused by the wiper arm of the pendulum potentiometer moving from pads e and f to pad d.

Figure 6:
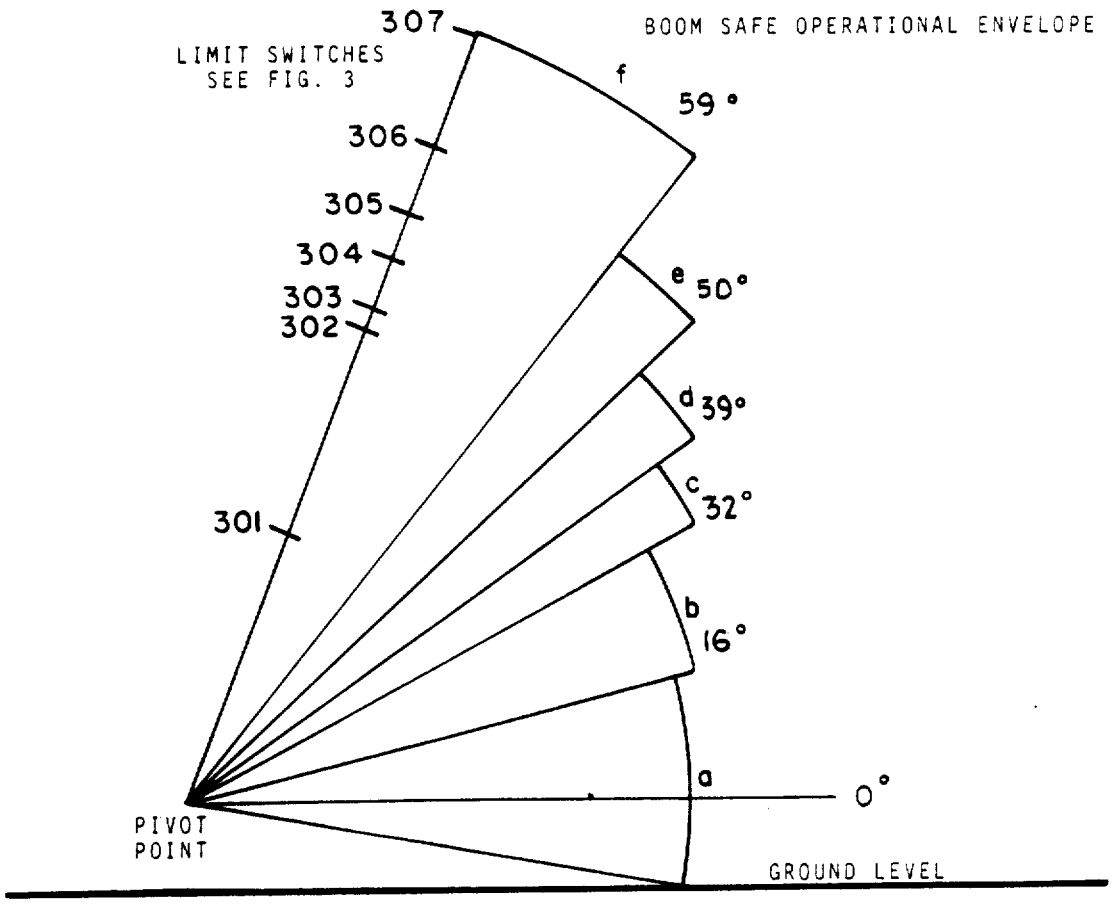
FIG. 6 is a graphic illustration of the boom safe operational envelope.

The boom cannot be lowered further under these circumstances until the boom length is shortened so that the boom will remain within the boom safe operational envelope of FIG. 6. For instance, if the boom is now shortened so that microswitch 305 is closed and 306 is open, a 0 will be applied to inverter 553 causing NAND gates 546 and 545 to produce high level outputs. Under these conditions, NAND gate 516 will maintain its low level output because the output of comparator 218 is low but the output of comparator 216 is high and thus NAND gate 501 is caused to produce a high level output which again activates the boom down amplifier 16.

The boom safe operational envelope of FIG. 6 includes a plurality of rays from the pivot point which are associated with microswitches 301 through 307 of FIG. 3. The upper ray of the diagram is annotated L1 through L7 to indicate the switch over points from microswitches 301 through 307 as the boom is extended or retracted. For instance, microswitch 301 of FIG. 3 will be closed as long as the boom is shorter than the length indicated between pivot point and L1. When the boom is extended between L1 and L2, microswitch 302 will be closed and all other microswitches will be open. When the boom moves to the segment between L2 and L3, microswitch 303 will close and all other microswitches will be open. In this fashion, microswitches 301 through 307 are sequentially and mutually exclusively turned on as the boom extends so that when the boom reaches the L7 arc of FIG. 6, microswitch 307 is closed.

The rays emanating from the pivot point of FIG. 6 describe arc segments associated with contact pads a through f of the pendulum boom potentiometer 202 of FIG. 2. For instance, when the boom is positioned between the 16° and 32° ray, the contact arm of the potentiometer maintains engagement with the b pad and 1.77 volts are applied to bus 219 of FIG. 2.

Figure 7:
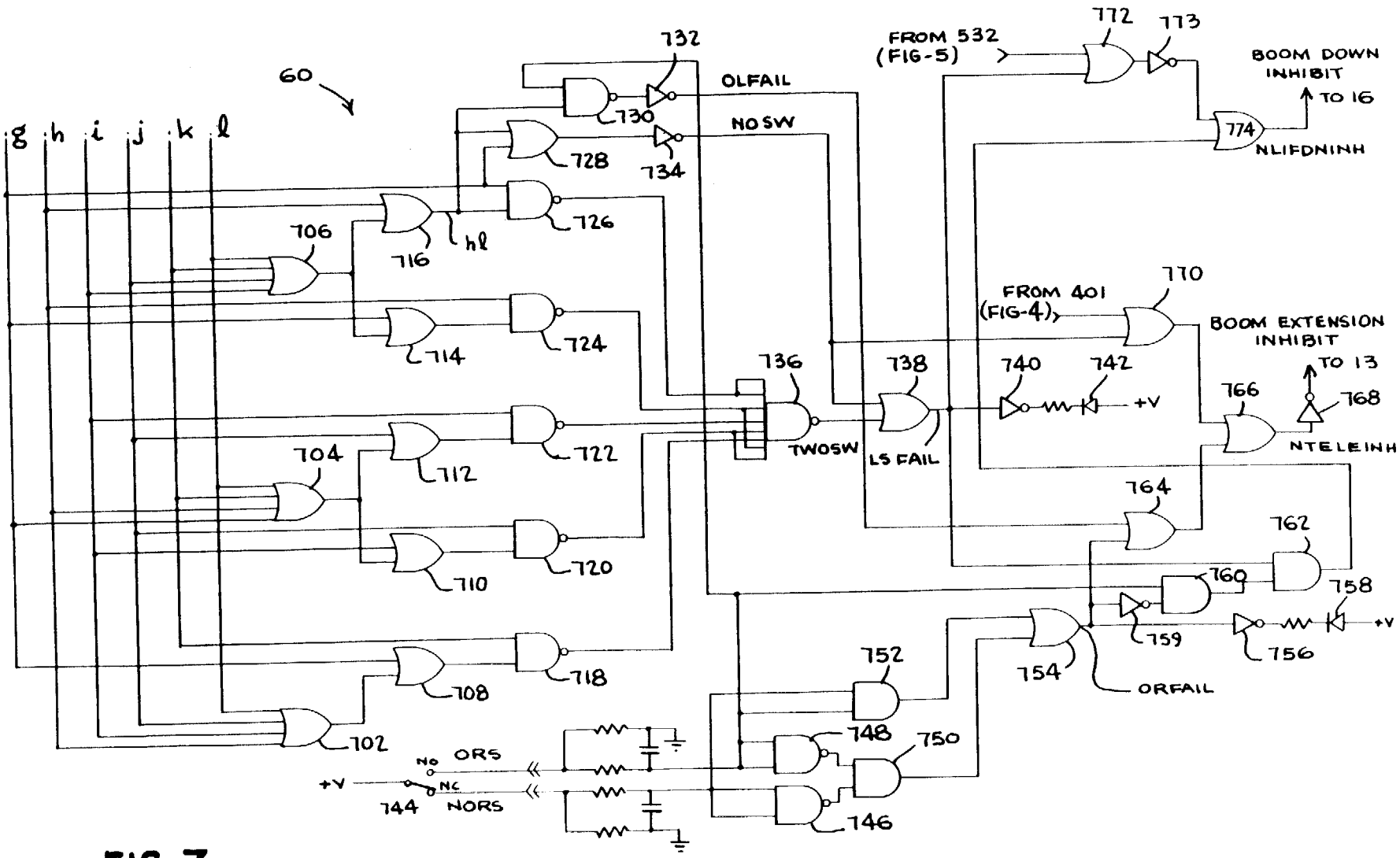
FIG. 7 is a schematic diagram of the boom length word generator monitoring circuit.

The monitoriong circuit 60 for detecting a malfunction within the boom length word generator 30 and in particular for detecting the malfunctioning of any one of the microswitches 301 through 307, as generally shown in FIG. 1, is described in more detail with respect to FIG. 7. More specifically, the monitoring circuit 60 detects whether any two of the microswitches 301 through 307 are closed at the same time or whether none of the microswitches 301 to 307 are activated and, if so malfunctioning provides inhibit signals that permit movement of the boom only in a mode that will serve to increase its stability, i.e., the boom may be only shortened or raised and may not be lowered or extended. However, while the boom is so inhibited from being lowered or extended, it is contemplated that if personnel were disposed within the basket of the boom, there would be no means of permitting the personnel to be brought to the ground. Therefore, the monitoring circuit 60 is provided with an override switch 774 to permit the inhibit signals to be overriden. Thus, it is further necessary to provide circuitry to detect the malfunction of the override switch 774.

As shown in FIG. 7, the monitoring circuit 60 is coupled to receive the outputs g, h, i, j, k, and l as derived from the microswitches 301 through 306, as shown in FIG. 3. If one of the microswitches 301 through 306 is activated or closed, its output signal will be at 12 volts DC and when not activated, its output will be at 0 volts. The output signals are variously connected to a plurality of OR gates 702, 704, 706, 708, 710, 712, 714, and 716, whereby it may be determined whether two of such output signals are present at the same instant. For example, each of the output signals i, j, k, and l are connected to the OR gate 706 which provides an output in response to the detection of any one of the aforementioned output signals to be applied to an input of the OR gate 716, whose other input is in turn connected to receive the output signal h. In turn, the output hl of the OR gate 716 indicating the presence of any one of the output signals h through l is applied to one input of a NAND gate 726, while the other input is derived from the output signal g. NAND gate 726 operates to provide a high output when one or more of its inputs are low or zero volts. Thus, if a one signal is applied to each of the NAND gates 726, as would happen when switch 301 and any of the switches 302 through 306 are closed or activated, a low or zero output is derived from the NAND gate 726, and is in turn applied to an input of a NAND gate 736. As also shown in FIG. 7, a NAND gate 724 is coupled to directly receive the output signal h and the output of OR gate 714 to indicate by its low output, the simultaneous activation of switch 302 and any of the remaining switches. In addition, NAND gates 722,720, and 718 are similarly connected to selected of the OR gates 712, 704, 710, 708, and 702 and indicate, respectively, by each of their low signals of the simultaneous activation of microswitches 303, 304, and 305, and any of the remaining switches. The outputs of each of the NAND gates 724, 722, 720, and 718, along with the output of NAND gate 726, are applied to the inputs of NAND gate 736. Thus, when the output signal TWOSW of NAND gate 736 is zero, the malfunction of two of the microswitches 301 through 306 does not exist; however, when the output signal TWOSW goes high, e.g., is disposed at 12 volts, there is an indication of a malfunction, i.e., simultaneous activation of two of the microswitches 301 through 306. The Boolean expression for the output signal TWOSW of NAND gate 736 is as follows:

$$L0(L1+L2+L3+L4+L5)+L1(L0+L2+L3+L4+L5)+L2(L0+L1+L3+L4+L5)+L3(L0+L1+L2+L4+L5)+(L4(L0+L1+L2=+L3+L5)=TWOSW$$

The monitoring circuit 60 of FIG. 7 also detects a malfunction in which none of the microswitches 301 through 306 is activated or closed. To this end, the output signal hl of the OR gate 716 is applied to a first input of an OR gate 728, while the other input receives the output g of the microswitch 301. Thus, if none of the output signals g through l are present, the output of the OR gate 728 will be low. As shown in FIG. 7, the output signal of the OR gate 728 is applied to an inverter 734 whose output is termed NOSW indicating when it is high the absence of any of the output signals g through l; by contrast, when the output NOSW is low, there is an indication that the malfunction wherein no microswitches 301 through 307 are closed, does not exist. The Boolean expression for the signal NOSW is as follows:

$$L0 \cdot L1 \cdot L2 \cdot L3 \cdot L4 \cdot L5 = NOSW$$

The output of the OR gate 738 termed LSFAIL goes high upon the occurrence of either of the TWOSW or NOSW signals and is applied to an inverter 740 to energize a light emitting diode LED 742 indicating the malfunction of the microswitches 301 through 306, i.e., the simultaneous activation or lack of activation of any of these switches.

Thus, if signals NOSW or TWOSW are high, inhibit signals NTELEINH and NLIFDNINH are applied, as shown in FIG. 1 generally, to the amplifiers 13 and 16, respectively, to inhibit the energization of the solenoid coils 14 and 17 thus preventing the activation of the hydraulic valves controlling boom extension and boom lowering. As shown in FIG. 7, a high signal NOSW is applied via OR gates 770 and 766 to inverter 768 which provides a low signal NTELEINH to inhibit boom extension. A high signal TWOSW is applied via OR gates 738 and 772, inverter 773 and OR gate 774 to provide a low signal NLIFDNINH to inhibit boom lowering. Even when a switch malfunction is detected, it is still desired to have the capability of lowering the boom and permitting the personnel carried by the boom's basket to be lowered to the ground. To this end, the override switch 744 is provided as shown in FIG. 7. The override switch 744 provides a first output signal termed ORS. When the switch 744 is closed, the ORS signal is high, e.g., 12 volts, and when the switch 744 is open, the ORS signal is low, e.g. zero volts DC. The second override switch output signal is termed NORS and is disposed high when the switch 744 is not activated and low when the switch 744 is activated. The ORS and NORS signals are monitored by the circuit 60 to determine both the simultaneous presence or absence of these signals. In particular, the NORS signal is applied via a NAND gate 746 acting as inverter to a first input of NAND gate 750, whereas the ORS signal is applied via a NAND gate 748 acting as inverter to the second input of the NAND gate 750. Thus, if each of the ORS and NORS signals is low, i.e., absent, the output of AND gate 750 will be high and is applied to an OR gate 754 which provides a high output signal ORFAIL. Similarly, when the high NORS and ORS signals are applied to the inputs of AND gate 752, it provides a high going signal to the other input of OR gate 754. Thus, if a high signal is applied to either of the inputs of the OR gate 750 indicating the absence or presence of both the ORS and NORS signals, an ORFAIL signal is generated and applied via an inverter 756 to energize a light emitting diode (LED) 758 to indicate the malfunction of the override switch 744. The Boolean expression for the operation of the aforedescribed circuit is as follows:

$$(ORS \cdot NORS) + (ORS \cdot NORS) = ORFAIL$$

The operation of the override switch 744 is designed to override the boom down inhibit signal NLIFDNINH only when the boom is fully retracted, i.e., telescoped in, and only the switch 301 is closed. Thus, the closure of the switch 744 will be defeated from overriding the inhibit signal NLIFDNINH if any of the switches 302 through 306 is closed and if any of their output signals h through l is present. To this end, the output hl of the OR gate 71 indicative of the presence of any one of the output signals h through l of the microswitches 302 through 306, is applied to a first input of a NAND gate 730. The ORS signal indicative of the closure of the override switch 744 is applied to the second input of the NAND gate 730. Thus, if both the ORS and hl signals are high, the NAND gate 730 provides a low output to be inverted by an inverter 732 to provide a high OLFAIL signal. The Boolean expression for the aforementioned circuit is as follows:

$$ORS(L1 + L2 + L3 + L4 + L5) = OLFAIL$$

The monitoring circuit 60 of FIG. 7 generates a low or zero signal NTELEINH to be applied to the amplifier 13 of FIG. 1 to inhibit the telescoping out of the boom as will now be described in more detail. In the presence of any of the high signals, NOSW, OLFAIL, or ORFAIL, a low signal NTELEINH will be generated. As shown in FIG. 7, a high ORFAIL signal is applied via the OR gates 764 and 766 to an inverter 768 which provides the low signal NTELEINH. The high OLFAIL signal is similarly applied via OR gates 764 and 766 to the inverter 768. The high NOSW signal is applied via OR gates 770 and 766 to the inverter 768. Thus, when the NTELEINH signal is low or at zero volts, the extending of or telescoping out of the boom is inhibited whereas when the NTELEINH signal is high, i.e., 12 volts, the boom extension switch 15 may be closed to extend the boom. The Boolean expression for the operation of this circuit is as follows:

$$NOSW + OLFAIL + ORFAIL = NTELEINH$$

The monitoring circuit 60, as shown in FIG. 7, senses the presence of a switch malfunction as indicated by high signals NOSW or TWOSW to generate a low or zero signal NLIFDNINH that is applied to the amplifier 16 to inhibit the boom down operation. In particular, the OR gate 738 responds to either of high signals NOSW or TWOSW as applied to its inputs to apply a high LSFAIL signal via OR gate 772 to an inverter 773 whose resultant low signal is applied to the OR gate 774, which provides the low signal NLIFDNINH to inhibit boom down operation.

The inhibit signal NLIFDNINH may be overriden and forced from a low to high state, e.g., to 12 volts, upon the closing of the override switch 744. In particular, the monitoring circuit 60 responds to a malfunction of the microswitches 301 through 306 as indicated by the presence of a high LSFAIL signal and to the successful operation of the override switch 744 as indicated by a low ORFAIL signal, to generate at the output of an AND gate 762 a high ORSG signal. In particular, the LSFAIL signal is applied to one input of the AND gate 762. Further, the low ORFAIL signal from the OR gate 752 is applied via an inverter 759 to a first input of an AND gate 760, while the high ORS signal is applied to the second input of the AND gate 760. Thus, if a high ORS signal is generated by the closure of the override switch 744 and the override 744 is operative as indicated by a low ORFAIL signal, the AND gate 760 applies a high output to the second input of the AND gate 762 which generates and applies a high ORSG signal to an input of the OR gate 774, thus driving the NLIFDNINH signal high and overriding the inhibit signal. The Boolean expression for NLIFDNINH is set out as follows:

$$LSFAIL + ORSG = NLIFDNINH$$

Thus, the monitoring circuit 60 operates to sense the malfunction of the limit microswitches 301 to 306, i.e., to detect the absence of actuation of any of or the actuation two or more of these switches. In the presence of such switch malfunctioning, the monitoring circuit 60 applies inhibit signals to each of the amplifier 13 and 16 to respectively inhibit the extension or lowering of the boom. An override switch 744 is provided to permit the lowering of the boom if the boom is fully retracted, thus permitting an operator as carried by the boom's basket to be lowered safely to the ground. Illustratively, the override switch 744 is disposed remotely at the boom's basket.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. An extensible boom safety control circuit comprising:

a. means for generating a coded boom angle word representing the boom angle of elevation comprising a voltage divider network including a pendulum potentiometer having a plurality of sequential swept contacts for providing discrete voltage levels representing boom angles; and electrical contact means for contacting said swept contacts of said pendulum potentiometer; an electrical bus connected to said electrical contact means; a plurality of voltage comparators connected in parallel to said electrical bus for producing a parallel, coded word representing boom angle; and a plurality of voltage dividers for providing reference potentials for said plurality of comparators;

b. means for generating a coded boom length word representing boom length, comprising a plurality of microswitches connected in parallel and means responsive to boom length for actuating said microswitches in a mutually exclusive fashion;

c. boom angle logic means responsive to said boom angle word and said boom length word for generating a boom extension control signal, wherein said boom angle logic means comprises a plurality of 3-input NAND gates each of which includes a first input electrically connected to one of said comparators, a second input electrically connected via an inverter to a different one of said comparators, and a third input electrically connected to one of said microswitches, and an inhibit function NAND gate including an input for each of said 3-input NAND gates, said 3-input NAND gates each connected to one of said inputs; and d. boom length logic means responsive to said boom length word and said boom angle word for generating a boom lowering control signal;

e. boom extension inhibit means responsive to said boom extension control signal for preventing boom extension; and f. boom down inhibit means responsive to said boom lowering control signal for preventing boom lowering.

2. An extensible boom safety control circuit as defined in claim 1 wherein said boom length logic means comprises:

a plurality of parallel, 2 input OR gates driven by the outputs of said comparators; a plurality of 2-input NAND gates, each having one input provided by one of said OR gates;

a NAND logic tree including a 2-input NAND gate, a 3-input NAND gate, a 4-input NAND gate, a 5-input NAND gate, and a 6-input NAND gate for providing second inputs to said plurality of 2-input NAND gates;

a plurality of inverters for applying an inverse function of said boom length word to said NAND gates of said NAND logic tree; and a boom down inhibit NAND gate including a number of inputs equal to the number of said plurality of 2-input NAND gates, each of said 2-input NAND gates providing an input to said boom down inhibit NAND gate.

3. An extensible boom safety control circuit as defined in claim 2 said boom extension inhibit means comprising:

a boom extension valve solenoid;

a boom extension control switch;

a boom extension amplifier for providing an energizing potential to said solenoid in response to closure of said boom extension control switch; and means to disable said boom extension amplifier in response to an output of said boom extension inhibit logic NAND gate.

4. An extensible boom safety control circuit as defined in claim 3 wherein said boom down inhibit means comprises:

a boom down control valve solenoid;

a boom down control switch;

a boom down amplifier for providing an energizing potential to said solenoid in response to closure of said boom down control switch; and means to disable said boom down amplifier in response to an output from said boom down inhibit NAND gate.

5. An extensible boom safety control circuit as defined in claim 4, comprising:

an individual light emitting diode connected to the output of each of said comparators.

6. An extensible boom safety control circuit as defined in claim 5, comprising:

an individual light emitting diode electrically connected to the output of each of said microswitches.

7. A safety control circuit for a variable length boom extensible in a rectilinear direction along its axis and pivotable between a down position and an up position, said safety control circuit comprising:

first means for generating a first coded word indicative of the angle of elevation of the boom from its down position;

second means for generating a second coded word indicative of the length of the boom;

boom extension control means disposable to a first state for permitting boom extension and to a second state for preventing boom extension;

boom lowering control means disposable to a first state for permitting boom lowering toward its down position and to a second state for preventing boom lowering to its down position;

first control logic responsive to the first and second coded words as indicative of an unstable boom condition for disposing said boom extension control means to its second state; and second control logic responsive to the first and second coded words as indicative of an unstable boom condition for disposing said boom lowering control means to its second state;

monitoring means responsive to said second coded word for providing an inhibit signal if said second means is malfunctioning, and said boom lowering control means responsive to said inhibit signal to be disposed to its second state.

8. A safety control circuit as claimed in claim 7 wherein said boom extension control means is responsive to said inhibit signal to be disposed to its second state.

9. A safety control circuit as claimed in claim 7 wherein said monitoring means comprises override switch means actuatable to provide an override signal and means responsive to said override signal for preventing the provision of said inhibit signal, whereby said boom lowering control means is disposed to its first state to permit the boom to be lowered.

10. A safety control circuit as claimed in claim 7, wherein said second generating means comprises a plurality of switches, each actuatable to provide an output, only one of said plurality of said switch means being actuatable at a time, said outputs of said plurality of switches forming the second coded word, said monitoring means responsive to the actuation of two or more of said plurality of switches for providing a first switch malfunction signal.

11. A safety control circuit as claimed in claim 10, wherein said monitoring means is responsive to the actuation of none of said plurality of switches for providing a second switch malfunction signal.

12. A safety control circuit as claimed in claim 10, wherein said boom lowering control means is responsive to the first switch malfunction signal to be disposed to its second state.

13. A safety control circuit as claimed in claim 11, wherein said boom extension control means is responsive to said second switch malfunction signal to be disposed to its second state.

*14. A safety control circuit for a variable length boom extensible in a rectilinear direction along its axis and pivotable between a down position and an up position, said safety control circuit comprising:*

*(a) first means for generating a first manifestation indicative of the angle of elevation of the boom from its down position;*

*(b) second means for generating a second manifestation indicative of the length of the boom;*

*(c) boom extension control means disposable to a first state for permitting boom extension and to a second state for preventing boom extension;*

*(d) boom lowering control means disposable to a first state for permitting boom lowering towards its down position and to a second state for preventing boom lowering towards its down position;*

*(e) first control logic responsive to the first and second manifestations indicative of an unstable boom condition for disposing said boom extension control means to its second state; and*

*(f) second control logic operating independently of said first control logic to respond to the first and second manifestations indicative of an unstable boom condition for disposing said boom lowering control means to its second state, whereby one of said boom extension control means and said boom lowering control means may be disposed to its first state while the other of said boom extension control means and said boom lowering control control means is disposed to its second state.*

*15. The safety control circuit as claimed in claim 14, wherein said first generating means comprises a voltage divider network including a pendulum potentiometer having a plurality of sequential swept contacts for providing discrete voltage levels representing boom angles, electrical contact means for contacting said swept contacts of said pendulum potentiometer, an electrical bus connected to said electrical contact means, a plurality of voltage comparators connected in parallel to said electrical bus for producing a parallel, coded word representing boom angle, and a plurality of voltage dividers for providing reference potentials for said plurality of comparators.*

*16. The control circuit as defined in claim 15, wherein said second generating means comprises a plurality of comparators connected in parallel, and means responsive to boom length for activating said microswitches n a mutually exclusive fashion.*

*17. A safety control circuit for a variable length boom extensible in a rectilinear direction along its axis and pivotable between a down position and an up position, said safety control circuit comprising:*

*(a) first means for generating a first manifestation indicative of the angle of elevation of the boom from its down position;*

*(b) second means for generating a second manifestation indicative of the length of the boom;*

*(c) boom extension control means disposable to a first state for permitting boom extension and to a second state for preventing boom extension;*

*(d) boom lowering control means disposable to a first state for permitting boom lowering toward its down position and to a second state for preventing boom lowering towards its down position;*

*(e) first control logic responsive to the first and second manifestations indicative of an unstable boom condition for disposing said boom extension control means to its second state; and*

*(f) second control logic operating independently of said first control logic to respond to the first and second manifestations indicative of an unstable boom condition for disposing said boom lowering control means to its second state, whereby said boom extension control means and said boom lowering control means are operative independently of each other to inhibit the extension of and the lowering of the boom, respectively, said first control logic being responsive to a first manifestation indicative of a first boom angle and a second manifestation indicative of a first boom length for disposing said boom extension control means to its second state, and said second control logic being responsive to said first manifestation indicative of said first given boom angle and to said second manifestation indicative of said first boom length for disposing said boom lowering control means to its first state, whereby the boom may be lowered but not extended.*

*18. The safety control circuit as claimed in claim 17, wherein said second control logic is responsive to a first manifestation indicative of a second boom angle less than said first boom angle and to said second manifestation indicative of said first boom length for disposing said boom lowering control means to its second state, whereby the boom may not be lowered.*

*19. The safety control circuit as claimed in claim 18, wherein said second control logic is responsive to said first manifestation indicative of said second boom angle and a second manifestation indicative of a second boom length less than said first boom length for disposing said boom lowering control means to its state.*

*20. The safety control circuit as claimed in claim 19, wherein said first control logic is responsive to said first manifestation indicative of said second boom angle and said second manifestation indicative of said second boom length for disposing said boom extension control means to its second state, whereby the boom may be lowered but not extended.*

*21. A safety control circuit for a variable length boom extensible in a rectilinear direction along its axis and pivotable between a down position and an up position, said safety control circuit comprising:*

*(a) first means for generating a first manifestation indicative of the angle of elevation of the boom from its down position;*

*(b) second means for generating a second manifestation indicative of the length of the boom;*

*(c) boom extension control means disposable to a first state for permitting boom extension and to a second state for preventing boom extension;*

(d) boom lowering control means disposable to a first state for permitting boom lowering toward its down position and to a second state for preventing boom lowering towards its down position;

(e) first control logic responsive to the first and second manifestations indicative of an unstable boom condition for disposing said boom extension control means to its second state; and (f) second control logic operating independently of said first control logic to correspond to the first and second manifestations indicative of an unstable boom condition for disposing said boom lowering control means to its second state, whereby said boom extension control means and said boom lowering control means are operative independently of each other to inhibit the extension of and the lowering of the boom, respectively, said first control logic being responsive to a first manifestation indicative of boom elevation in a first range defined by a first, relatively high boom angle and a second, relatively low boom angle and including said first boom angle and to a second manifestation indicative of a first boom length for disposing said boom extension control means to its second state, and said second control logic being responsive to said first manifestation indicative of said first boom angle range and to said second manifestation indicative of said first boom length for disposing said boom lowering control means to its first state, whereby the boom may be lowered but not extended.

*22. The safety control circuit as claimed in claim 21, wherein said second control logic is responsive to a first manifestation indicative of said second boom angle and to said second manifestation indicative of said first boom length for disposing said boom lowering control means to its second state, whereby the boom may not be lowered.*

*23. The safety control circuit as claimed in claim 22, wherein said second control logic is responsive to a first manifestation indicative of boom elevation in a second range defined by said second boom angle and a third boom angle lower than said second boom angle and including said second boom angle and to a second manifestation indicative of a second boom length less than said first boom length for disposing said boom lowering control means to its first state.*

*24. The safety control circuit as claimed in claim 23, wherein said first control logic is responsive to said first manifestation indicative of boom elevation in said second range and to said second manifestation indicative of said second boom length for disposing said boom extension control means to its second state, whereby the boom may not be extended.*

* * * * *